H. A. BARNARD.
ROTARY GRAIN SEPARATOR

No. 177,789. Patented May 23, 1876.

WITNESSES
Franck L. Durand
C. L. Enck

INVENTOR
H. A. Barnard
By T. H. Alexander
Attorney

UNITED STATES PATENT OFFICE.

HEMAN A. BARNARD, OF MOLINE, ILLINOIS, ASSIGNOR TO THE BARNARD & LEAS MANUFACTURING COMPANY, OF SAME PLACE.

IMPROVEMENT IN ROTARY GRAIN-SEPARATORS.

Specification forming part of Letters Patent No. 177,789, dated May 23, 1876; application filed January 28, 1876.

*To all whom it may concern:*

Be it known that I, HEMAN A. BARNARD, of Moline, in the county of Rock Island, and State of Illinois, have invented certain new and useful Improvements in Corn-Cleaners; and I do hereby declare that the following is a full, clear, and exact description thereof, reference being had to the accompanying drawings, and to the letters of reference marked thereon, which form a part of this specification.

The nature of my invention consists in the construction and arrangement of a corn-cleaning apparatus, as will be hereinafter more fully set forth.

In order to enable others skilled in the art to which my invention appertains to make and use the same, I will now proceed to describe its construction and operation, referring to the annexed drawing, in which—

Figure 1:
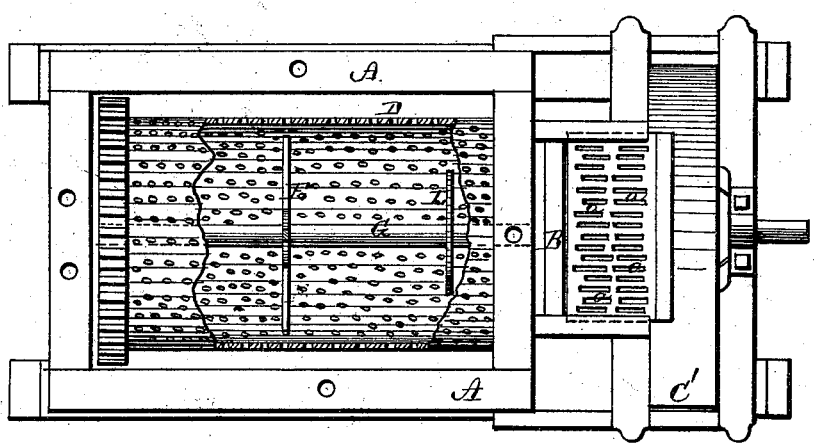
Figure 2:
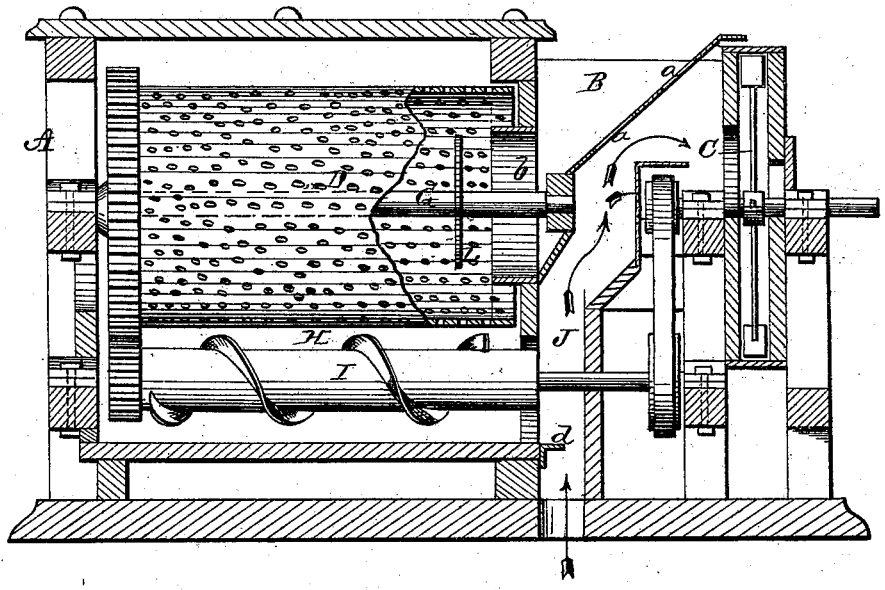

Figure 1 is a plan view, and Fig. 2, a longitudinal vertical section, of my invention.

The object of my invention is to separate the cobs from the shelled corn, and to clean the corn for market.

In warehouses and elevators the sheller is usually located in the basement, and shells only. The shelled corn and cobs are then elevated together and pass into a cleaner, which is located where most convenient, mostly in the upper story of the building. My machine is for this purpose.

A represents a suitable frame-work containing a rolling screen, a suction-fan and a separating-trunk. The cobs and shelled corn pass into a hopper, B, on the top of the frame. This hopper has openings $a$ on the side next to the fan C, to draw in the dust and chaff into the fan, which discharges it through the fan-mouth at C', whence, by a dust-chute, it may be blown to any place desired, such as a dust-room, or out into the open air.

The spout from the top of the elevator to the hopper B should be a closed or tight spout.

The corn and cobs then pass through the opening $b$ into the rolling screen, consisting of a perforated sheet-iron cylinder, D, connected by cast-iron spiders E to a central wrought-iron shaft, G. Here the shelled corn is separated from the cobs by the motion of the screen, the corn dropping through the screen and the cobs passing out of the rear end of it, and thence spouted to any desired locality.

The corn falling through the screen is gathered by the sheet-iron cants H to the conveyer I below, which discharges it into the separating-trunk J.

The suction of the fan draws a strong current of air up through the trunk J into the fan, which current is strong enough to draw up all impurities, such as small cob-ends, silks, chaff, &c., that may have passed through the openings in the screen, thus leaving the corn clean for shipment.

On the shaft G of the screen is fastened a circular disk or shield, L, near the opening $b$, and which shield revolves with the shaft. This is to prevent the corn from passing too far into the screen, as in falling from the elevator and striking the sides of the hopper it might bound clear out at the tail end of the screen among the cobs, and thus be wasted. It also increases the capacity of the screen by making the corn drop at the head of the screen, thus utilizing the whole length of it.

Motion is given to the fan by belt and pulley on the fan-shaft, and from the inner end of said shaft another belt revolves the conveyer. The screen is rotated by gear-wheels from the conveyer.

In the lower end of the separating-trunk J is a spreader, $d$, which is to spread the corn from the conveyer, so that the air ascending the trunk can act on it effectually. This spreader consists of an angular plate attached to the end of the conveyer, within the separating-trunk, so that as the corn is passed out of the conveyer it is spread over the spreader in a thin sheet, and the air can pass through it easily.

Having thus fully described my invention, what I claim as new, and desire to secure by Letters Patent, is—

1. In a corn-cleaner, the hopper B, provided with one or more series of openings, $a$, in its side, for the purposes set forth.

2. The combination, in a corn-cleaner, of a rotating cylindrical screen, D, hopper B, conveyer I, separating-trunk J, and suction-fan C, all constructed and arranged substantially as and for the purposes herein set forth.

In testimony that I claim the foregoing as my own, I affix my signature in presence of two witnesses.

HEMAN A. BARNARD.

Witnesses:
ELSWORTH MAPES,
J. SILAS LEAS.